US012764777B2

(12) United States Patent
Wu

(10) Patent No.: US 12,764,777 B2
(45) Date of Patent: Oct. 13, 2026

(54) MULTI-LINK DEVICE OF DISPATCHING PACKETS ACCORDING TO TRANSMISSION CONDITION AND LINK USAGE INFORMATION AND METHOD OF CONTROLLING THE SAME

(71) Applicant: Realtek Semiconductor Corp., HsinChu (TW)

(72) Inventor: Cheng-Hsuan Wu, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 403 days.

(21) Appl. No.: 18/525,875

(22) Filed: Dec. 1, 2023

(65) Prior Publication Data

US 2024/0323999 A1 Sep. 26, 2024

(30) Foreign Application Priority Data

Mar. 23, 2023 (TW) ................................ 112110859

(51) Int. Cl.
*H04W 72/56* (2023.01)
*H04W 72/12* (2023.01)

(52) U.S. Cl.
CPC ........... *H04W 72/56* (2023.01); *H04W 72/12* (2013.01)

(58) Field of Classification Search
CPC ..... H04W 72/56; H04W 72/12; H04W 72/04; H04W 76/15; H04W 76/20; H04W 74/08; H04W 28/22; H04W 28/10; H04W 28/08; H04W 28/09; H04W 28/02; H04W 28/04; H04W 28/06; H04W 48/02; H04L 47/12; H04L 47/34; H04L 47/62; H04L 69/14; H04L 12/70; H04L 12/74; H04L 12/86; H04L 45/24; H04L 45/54
USPC .......................................................... 370/235
See application file for complete search history.

(56) References Cited

U.S. PATENT DOCUMENTS 8,046,486 B2 * 10/2011 Amir ....................... H04L 47/28 370/235
10,771,294 B1 * 9/2020 Bhat Noojady Krishna ............... H04L 65/70
11,510,269 B2 * 11/2022 Asterjadhi ............ H04W 76/20
11,917,704 B2 * 2/2024 Kim ...................... H04W 76/15
(Continued)

FOREIGN PATENT DOCUMENTS

TW I783884 B 11/2022

*Primary Examiner* — Man U Phan
(74) *Attorney, Agent, or Firm* — Winston Hsu

(57) ABSTRACT

A multi-link transmission device includes a first transmission module, a second transmission module, an analysis module and a multi-link control module. The first transmission module transmits each packet in the first transmission module via a first link, and transmits a first transmission condition for each pack transmission for the first transmission module. The second transmission module transmits each packet in the second transmission module via a second link, and transmits a second transmission condition for each pack transmission for the second transmission module. The analysis module computes a ratio of packet consumption rates of the first transmission module and the second transmission module according to the first transmission condition and the second transmission condition. The multi-link control module dispatches a packet to the first transmission module or the second transmission module according to at least the ratio of the packet consumption rates.

20 Claims, 7 Drawing Sheets

(56) References Cited

U.S. PATENT DOCUMENTS

| | | | | |
|---|---|---|---|---|
| 12,058,753 | B2 * | 8/2024 | Jang | H04W 76/11 |
| 12,316,542 | B2 * | 5/2025 | Kabbani | H04L 45/24 |
| 12,414,189 | B2 * | 9/2025 | Asterjadhi | H04W 52/0235 |
| 12,550,213 | B2 * | 2/2026 | Shafin | H04W 76/15 |
| 2006/0227788 | A1 * | 10/2006 | Eldar | H04L 49/901 370/395.4 |
| 2023/0292238 | A1 * | 9/2023 | Shafin | H04W 52/0229 |
| 2024/0260106 | A1 * | 8/2024 | Shafin | H04W 8/005 |
| 2025/0287444 | A1 * | 9/2025 | Kucharewski | H04W 76/10 |
| 2025/0374178 | A1 * | 12/2025 | Li | H04W 48/20 |

* cited by examiner

MULTI-LINK DEVICE OF DISPATCHING PACKETS ACCORDING TO TRANSMISSION CONDITION AND LINK USAGE INFORMATION AND METHOD OF CONTROLLING THE SAME

BACKGROUND OF THE INVENTION

1. Field of the Invention

The invention relates to wireless communication, and in particular, to a multi-link device and a method of operating the same.

2. Description of the Prior Art

IEEE 802.11be standard specifies communication protocols of wireless access technologies for the new generation of Wi-Fi 7, supporting multi-link operations (MLO) and a block acknowledgment (BA) mechanism. MLO can be adopted to aggregate multiple channels over different frequency bands, so as to ensure seamless data transmission regardless of signal interference or network congestion in certain frequency bands, enhancing the data rate and reliability of the network, and being significant in video streaming and gaming applications requiring stable, continuous and real-time transmission quality. The BA mechanism uses a BA frame to acknowledge reception of a set of packets having been successfully received. MLO and BA may be configured to achieve a high data rate, high throughput, and low latency.

In the related art, during a data transmission, a multi-link device employs software to control the data flow of each link. However, each link is independent of another link and cannot exchange information with each other during the data transmission. Thus, the transmission of control information to the software will introduce significant transmission delay and consume a lot of system resources, failing to meet the timing requirements of transmitting the control information, and being incapable of transmitting a radio environment report to software in the upper layers in a data system such as a universal serial bus (USB) system. Consequently, the software in the upper layers is unable to obtain the control information, leading to inaccurate data flow control for each link. Further, even if the control information may be obtained, the radio environment might vary as the software uses the system resources to schedule transmission resources and set up the radio environment to perform a packet transmission, resulting in inefficient resource allocation.

SUMMARY OF THE INVENTION

According to an embodiment of the invention, a multi-link device includes a first transmission module, a second transmission module, an analysis module and a multi-link control module. The first transmission module is used to perform a packet transmission on a set of packets in the first transmission module via a first link, and transmit a first transmission condition for each packet transmission of the first transmission module. The second transmission module is used to perform a packet transmission on a set of packets in the second transmission module via a second link, and transmit a second transmission condition for each packet transmission of the second transmission module. The analysis module is coupled to the first transmission module and the second transmission module, and is used to compute a ratio of packet consumption rates of the first transmission module and the second transmission module according to the first transmission condition and the second transmission condition. The multi-link control module is coupled to the first transmission module, the second transmission module and the analysis module, and is used to compute a ratio of packet dispatch rates of the first transmission module and the second transmission module, adjust a first minimum threshold and a first maximum threshold of the first transmission module and/or a second minimum threshold and a second maximum threshold of the second transmission module according to at least the ratio of packet consumption rates if the ratio of packet consumption rates is different from the ratio of packet dispatch rates, and dispatch a packet to the first transmission module or the second transmission module according to the first minimum threshold, the first maximum threshold, the second minimum threshold, and/or the second maximum threshold.

According to another embodiment of the invention, a multi-link device includes a first transmission module, a second transmission module, an analysis module and a multi-link control module. The analysis module is coupled to the first transmission module and the second transmission module, and the multi-link control module is coupled to the first transmission module, the second transmission module and the analysis module. A method of controlling the multi-link device includes the first transmission module performing a packet transmission on a set of packets in the first transmission module via a first link, and transmitting a first transmission condition for each packet transmission of the first transmission module, the second transmission module performing a packet transmission on a set of packets in the second transmission module via a second link, and transmitting a second transmission condition for each packet transmission of the second transmission module, and the analysis module computing a ratio of packet consumption rates of the first transmission module and the second transmission module according to the first transmission condition and the second transmission condition. The method further includes the multi-link control module computing a ratio of packet dispatch rates of the first transmission module and the second transmission module, the multi-link control module adjusting a first minimum threshold and a first maximum threshold of the first transmission module and/or a second minimum threshold and a second maximum threshold of the second transmission module according to at least the ratio of packet consumption rates if the ratio of packet consumption rates is different from the ratio of packet dispatch rates; and the multi-link control module dispatching a packet to the first transmission module or the second transmission module according to the first minimum threshold, the first maximum threshold, the second minimum threshold, and/or the second maximum threshold.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
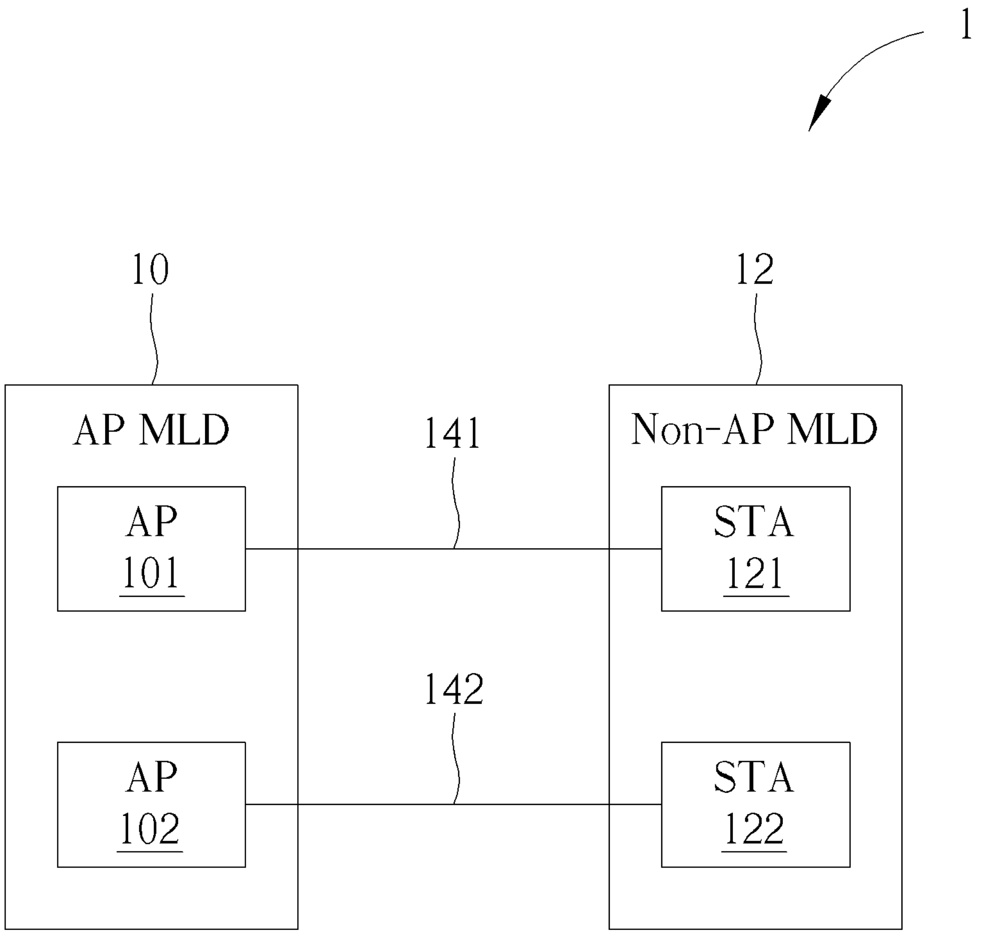
FIG. 1 is a schematic diagram of a multi-link communication system according to an embodiment of the invention.

FIG. 1 is a schematic diagram of a multi-link communication system 1 according to an embodiment of the invention. The multi-link communication system 1 includes an access point multi-link device (AP MLD) 10 and a non-access point multi-link device (non-AP MLD) 12. The multi-link communication system 1 is compatible with IEEE 802.11 standard, for example, IEEE 802.11be standard.

The AP MLD 10 includes access points (AP) 101 and 102, and the non-AP MLD 12 may include stations (STA) 121 and 122. The APs 101 and 102, and the STAs 121 and 122 may be logical devices, and may be implemented by hardware, software, firmware, or a combination thereof. The AP MLD 10 and the non-AP MLD 12 may establish links 141 and 142 therebetween in different frequency bands in 2.4G, 5G and 6G frequency bands. For example, the link 141 may be operated in the frequency band of 2.4 GHz, and the link 142 may be operated in the frequency band of 5 GHz. In another example, the link 141 may be operated in a high frequency band of 5 GHz, and the link 142 may be operated in a low frequency band of 2.4 GHz. The access point 101 and the access point 102 may communicate with the station 121 and the station 122 via the link 141 and the link 142, respectively.

The AP MLD 10 and the non-AP MLD 12 may adopt a block acknowledgment (BA) mechanism to communicate with each other. The AP MLD 10 and the non-AP MLD 12 may establish a BA agreement for a multi-link operation (MLO) between the AP MLD 10 and the non-AP MLD 12. The BA agreement includes a BA window size for the AP MLD 10 and the non-AP MLD 12 to maintain the BA window during the BA session. The BA window size may be 64, 128, 256, 1024 or other numbers of media access control (MAC) packets. Each MAC packet may have a sequence number (SN) and may be indexed according to the sequence number thereof. For example, a driver on the AP MLD 10 may divide a single file into 2048 MAC packets, and attach sequence numbers from 1 to 2048 respectively to the 2048 MAC packets. In each packet transmission, the non-AP MLD 12 or AP MLD 10 may maintain a range of the sequence numbers of the transmitted MAC packets within the BA window size, so as to prevent a sequence number overflow. For example, if the BA window size is 1024 MAC packets, the AP MLD 10 may maintain the range of the sequence numbers of the MAC packets in each packet transmission within 1024. In one example, after the AP MLD 10 transmits 1024 MAC packets having the sequence numbers from 1 to 1024 via the link 141 and/or 142 to the non-AP MLD 12, the non-AP MLD 12 may respond with a BA frame to confirm whether the 1024 MAC packets are successfully received, so as to reduce the overhead of the multi-link communication system 1 and enhance the throughput.

The AP MLD 10 and/or the non-AP MLD 12 may adjust the numbers of MAC packets allocated to the link 141 and the link 142 according to transmission conditions and/or link usage information of the link 141 and the link 142, so as to enhance the transmission reliability, reduce the data latency, and reduce the signal interference.

The present invention is not limited to the 2 links between the AP MLD 10 and the non-AP MLD 12 as in FIG. 1, and other numbers of links may be established between the AP MLD 10 and the non-AP MLD 12 link.

Figure 2:
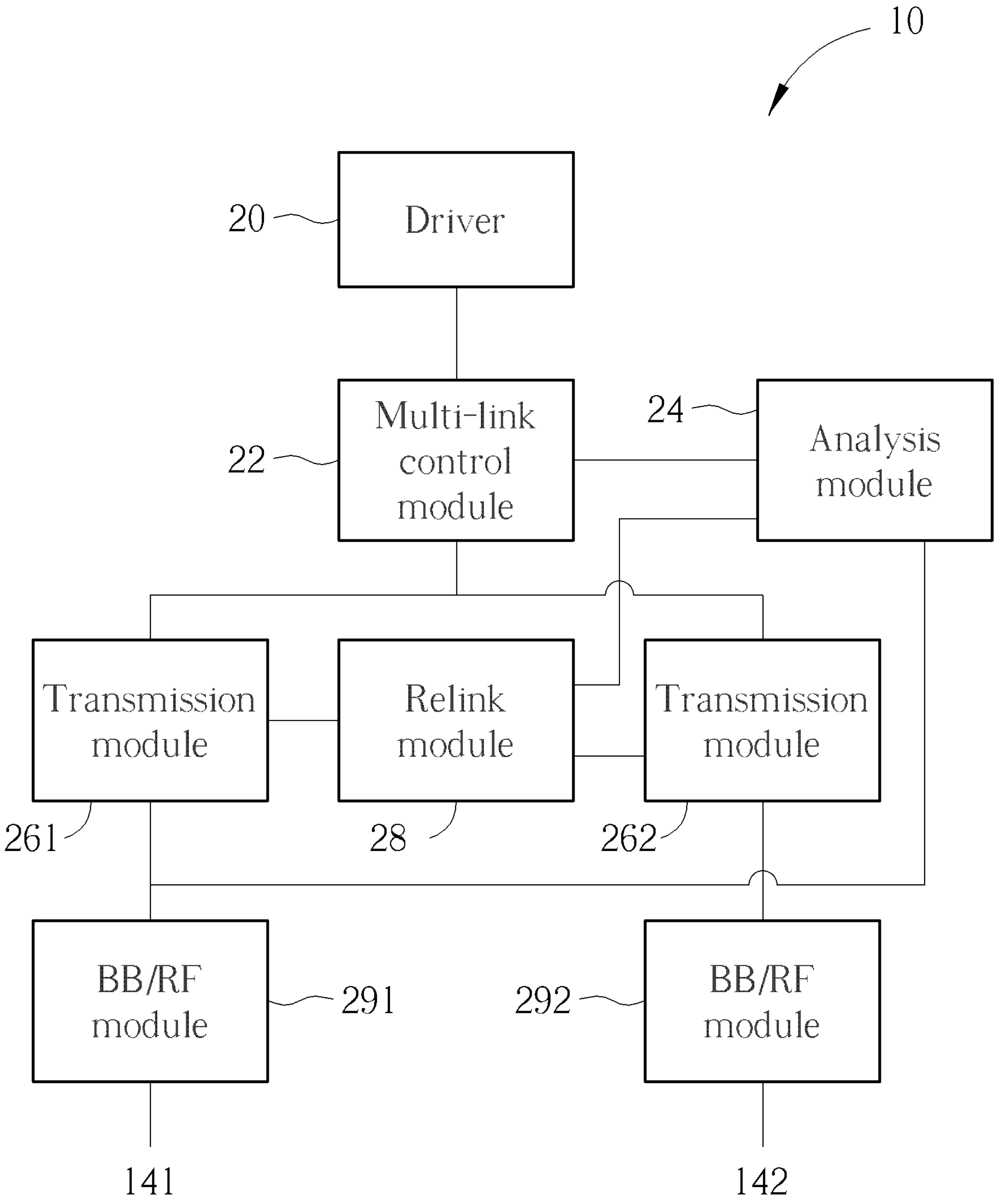
FIG. 2 is a block diagram of an access point multi-link device (AP MLD) according to an embodiment of the invention.

FIG. 2 is a block diagram of a MLD according to an embodiment of the invention, and the MLD may be the AP MLD 10 or non-AP MLD 12. For the MLD being the AP MLD 10, the AP MLD 10 may include a driver 20, a multi-link control module 22, an analysis module 24, a transmission module 261, a transmission module 262, a relink module 28, a baseband/radio frequency (BB/RF) module 291 and a BB/RF module 292. The analysis module 24 may be coupled to the transmission module 261 and the transmission module 262. The multi-link control module 22 may be coupled to the transmission module 261, the transmission module 262 and the analysis module 24. The relink module 28 may be coupled to the transmission module 261, the transmission module 262 and the analysis module 24. The BB/RF module 291 may be coupled to the transmission module 261, and the BB/RF module 292 may be coupled to the transmission module 262. The multi-link control module 22, the analysis module 24, the transmission module 261 and the transmission module 262 may be implemented by hardware, firmware or a combination thereof. The multi-link control module 22, the transmission module 261 and the transmission module 262 may each include a queue.

The driver 20 may perform signal processing for the upper layers, the multi-link control module 22, the analysis module 24, the transmission module 261, the transmission module 262 and the relink module 28 may perform signal processing for the MAC layer, and the BB/RF module Group 291 and BB/RF module 292 may perform signal processing for the physical layer.

The multi-link control module 22 may obtain a plurality of MAC packets from the driver 20 or other upper-layer applications, and buffer the MAC packets. The multi-link control module 22 may control a packet flow. In some embodiments, the multi-link control module 22 may determine whether to dispatch the MAC packets according to the BA window size, e.g., the BA window size may be 1024. If the sequence numbers of the MAC packets fail to satisfy the requirement of the BA window size, the multi-link control module 22 may buffer the MAC packets without dispatching the MAC packets. If the sequence numbers of the MAC packets satisfy the requirement of the BA window size, the multi-link control module 22 may dispatch the MAC packets to the transmission module 261 and/or the transmission module 262. In some embodiments, in the initial state, neither the transmission module 261 nor the transmission module 262 has a MAC packet stored, and the multi-link control module 22 may dispatch the MAC packets to the transmission module 261 and/or the transmission module 262 according to the default priorities of the transmission module 261 and the transmission module 262. For example, the multi-link control module 22 may assign a first priority to the transmission module 261, and assign a second priority to the transmission module 262, the first priority being higher than the second priority. Therefore, the multi-link control module 22 may dispatch the MAC packets to the transmission module 261 first, and then dispatch the remaining MAC packets to the transmission module 262 after the transmission module 261 is full.

The transmission module 261 may buffer one or more MAC packets, and compete for a transmission opportunity of the link 141 by carrier-sense multiple access with collision avoidance (CSMA/CA). The sequence numbers of the MAC packets in the transmission module 261 may be continuous or discontinuous. Upon acquiring the transmission opportunity of the link 141, the transmission module 261 may transmit a set of MAC packets from the transmission module 261 to the BB/RF module 291, and the BB/RF module 291 may perform baseband and RF signal processing on the set of MAC packets of the transmission module 261, and transmit the set of MAC packets of the transmission module 261 via the link 141. The set of MAC packets may be referred to as an aggregate MAC protocol data unit (AMPDU). The AMPDU of the transmission module 261 may include, for example, 128 MAC packets. Next, the BB/RF module 291 may transmit the information of whether each MAC packet in the AMPDU of the transmission module 261 is successfully transmitted to the transmission module 261, and the transmission module 261 may transmit a first transmission condition of each packet transmission to the analysis module 24, the first transmission condition including the number of successfully transmitted MAC packets, the transmission rate, and/or the retry rate of the AMPDU of the transmission module 261.

Similarly, the transmission module 262 may buffer one or more MAC packets, and compete for a transmission opportunity of the link 142 using CSMA/CA. The sequence numbers of the MAC packets in the transmission module 262 may be continuous or discontinuous. Upon acquiring the transmission opportunity of the link 142, the transmission module 262 may transmit a set of MAC packets (AMPDU) from the transmission module 262 to the BB/RF module 292, and the BB/RF module 292 may perform baseband and RF signal processing on the set of MAC packets of the transmission module 262, and transmit the set of MAC packets of the transmission module 262 via the link 142. For example, the AMPDU of the transmission module 262 may include 64 MAC packets. Next, the BB/RF module 292 may transmit the information of whether each MAC packet in the AMPDU of the transmission module 262 is successfully transmitted to the transmission module 262, and the transmission module 262 may transmit a second transmission condition of each packet transmission to the analysis module 24, the second transmission condition including the number of successfully transmitted MAC packets, the transmission rate, and/or the retry rate of the AMPDU of the transmission module 262.

The analysis module 24 may compute a ratio RC1:RC2 of a packet consumption rate of the transmission module 261 to a packet consumption rate of the transmission module 262 (hereinafter referred to as the ratio of packet consumption rates) according to the first transmission condition and the second transmission condition in a predetermined period, wherein RC1 is the packet consumption rate of the transmission module 261, RC2 is the packet consumption rate of the transmission module 262. The predetermined period may be a target beacon transmission time (TBTT). For example, if the analysis module 24 receives the first transmission condition and the second transmission condition between two adjacent TBTTs, the number of successfully transmitted MAC packets in the first transmission condition being 128 and the number of successfully transmitted MAC packets in the second transmission condition being 64, the analysis module 24 may compute the ratio of packet consumption rates in the second TBTT as 2:1 (=128:64).

Since all stations are waiting for a beacon frame in the TBTT, the analysis module 24 may compute in the TBTT the ratio of packet consumption rates to adjust in the TBTT a ratio RD1:RD2 of a packet dispatch rate of the transmission module 261 to a packet dispatch rate the transmission module 262 (hereinafter referred to as the ratio of packet dispatch rates), so as to reduce the impact of adjustments of the packet dispatch rates on the data transmissions in the link 141 and the link 142, wherein RD1 is the packet dispatch rate of the transmission module 261, and RD2 is the packet dispatch rate of the transmission module 262. The multi-link control module 22 may receive the ratio of packet consumption rates from the analysis module 24, and compute the ratio of packet dispatch rates. For example, if the number of packets dispatched to the transmission module 261 by the multi-link control module 22 between two TBTTs is 128, and the number of packets dispatched to the transmission module 262 by the multi-link control module 22 between the two TBTTs is also 128, the multi-link control module 22 may compute the ratio of packet dispatch rates as 1:1 (=128:128).

In an initial state, the transmission module 261 may set a first minimum threshold and a first maximum threshold, and the transmission module 266 may set a second minimum threshold and a second maximum threshold. The first maximum threshold may be greater than the first minimum threshold and may be a positive multiple of the first minimum threshold, such as twice, and the second maximum threshold may be greater than the second minimum threshold and may be a positive multiple of the second minimum threshold, such as twice. In some embodiments, the first minimum threshold, the first maximum threshold, the second minimum threshold, and the second maximum threshold may be preset values. For example, the first minimum threshold may be preset to 128, the first maximum threshold may be preset to 256, the second minimum threshold may be preset to 128, and the second maximum threshold may be preset to 256.

If the ratio of packet consumption rates is different from the ratio of packet dispatch rates, the multi-link control module 22 may adjust the first minimum threshold and the first maximum threshold of the transmission module 261 and/or the second minimum threshold and the second maximum threshold of the transmission module 262 according to at least the ratio of packet consumption rates, and dispatch the MAC packets to the transmission module 261 or the transmission module 262 according to the first minimum threshold, the first maximum threshold, the second minimum threshold, and/or the second maximum threshold. In some embodiments, if the ratio of packet consumption rates is different from the ratio of packet dispatch rates, the multi-link control module 22 may adjust the ratio of first minimum threshold and the second minimum threshold to the ratio of packet consumption rates, and/or adjust a ratio of first maximum threshold to the second maximum threshold to the ratio of packet consumption rates. For example, if the ratio of packet consumption rates is 2:1 and the ratio of packet dispatch rates is 1:1, since the ratio of packet consumption rates is different from the ratio of packet dispatch rates, the multi-link control module 22 may adjust the first minimum threshold to 128, the first maximum threshold to 256, the second minimum threshold to 64, and the second maximum threshold to 128 according to the ratio of packet consumption rates (=2:1), so that the ratio of first maximum threshold to the second maximum threshold (=2:1) and the ratio of first minimum threshold to the second minimum threshold (=2:1) are both equal to the ratio of packet consumption rates (=2:1).

In some embodiments, the multi-link control module 22 may further adjust the first maximum threshold and the first minimum threshold of the transmission module 261 according to a first maximum aggregation number setting supported by the link 141, and/or adjust the second maximum threshold and the second minimum threshold of the transmission module 262 according to a second maximum aggregation number setting supported by the link 142. The first maximum aggregation number may be determined according to the first transmission condition and a software or hardware setting associated with the link 141, and the second maximum aggregation number may be determined according to the second transmission condition and a software or hardware setting associated with the link 142. The first maximum aggregation number and the second maximum aggregation number may be equal to or different from each other. For example, if the first maximum aggregation number is 128 and the second maximum aggregation number is 64, the first minimum threshold may be set to 128 (the first maximum aggregation number), and the first maximum threshold may be set to 256 (twice the first maximum aggregation number), the second minimum threshold may be set to 64 (the second maximum aggregation number), and the second maximum threshold may be set to 128 (twice the second maximum aggregation number).

Since the radio environment varies over time, the connection qualities of the link 141 and the link 142 will vary with the radio environment. In some embodiments, the analysis module 24 may further obtain first link usage information of the link 141 from the BB/RF module 291 and second link usage information of the link 142 from the BB/RF module 292, thereby determining the connection quality of the link 141 and the link 142. The first link usage information may include a clear channel assessment (CCA) result and/or a network allocation vector (NAV) of the link 141, and the second link usage information may include a CCA result and/or a NAV of the link 142. When it is detected that the energy of the preamble of a 802.11 transmission and/or channel exceeds a preset threshold, the analysis module 24 may determine that the CCA result of the link is busy. Upon detecting the NAV having a non-zero value, the analysis module 24 may determine that the link is busy. The multi-link control module 22 may further receive the first link usage information and the second link usage information from the analysis module 24, adjust the first minimum threshold and the first maximum threshold according to the first link usage information, and adjust the second minimum threshold and the second maximum threshold according to the second link usage information. For example, if both the CCA result and the NAV of the link 141 between two adjacent TBTTs show that the link 141 is idle, and both the CCA results and/or the NAV of the link 142 show that the link 142 is busy, then the multi-link control module 22 may increase the first minimum threshold and the first maximum threshold, and decrease the second minimum threshold and the second maximum threshold.

Figure 4:
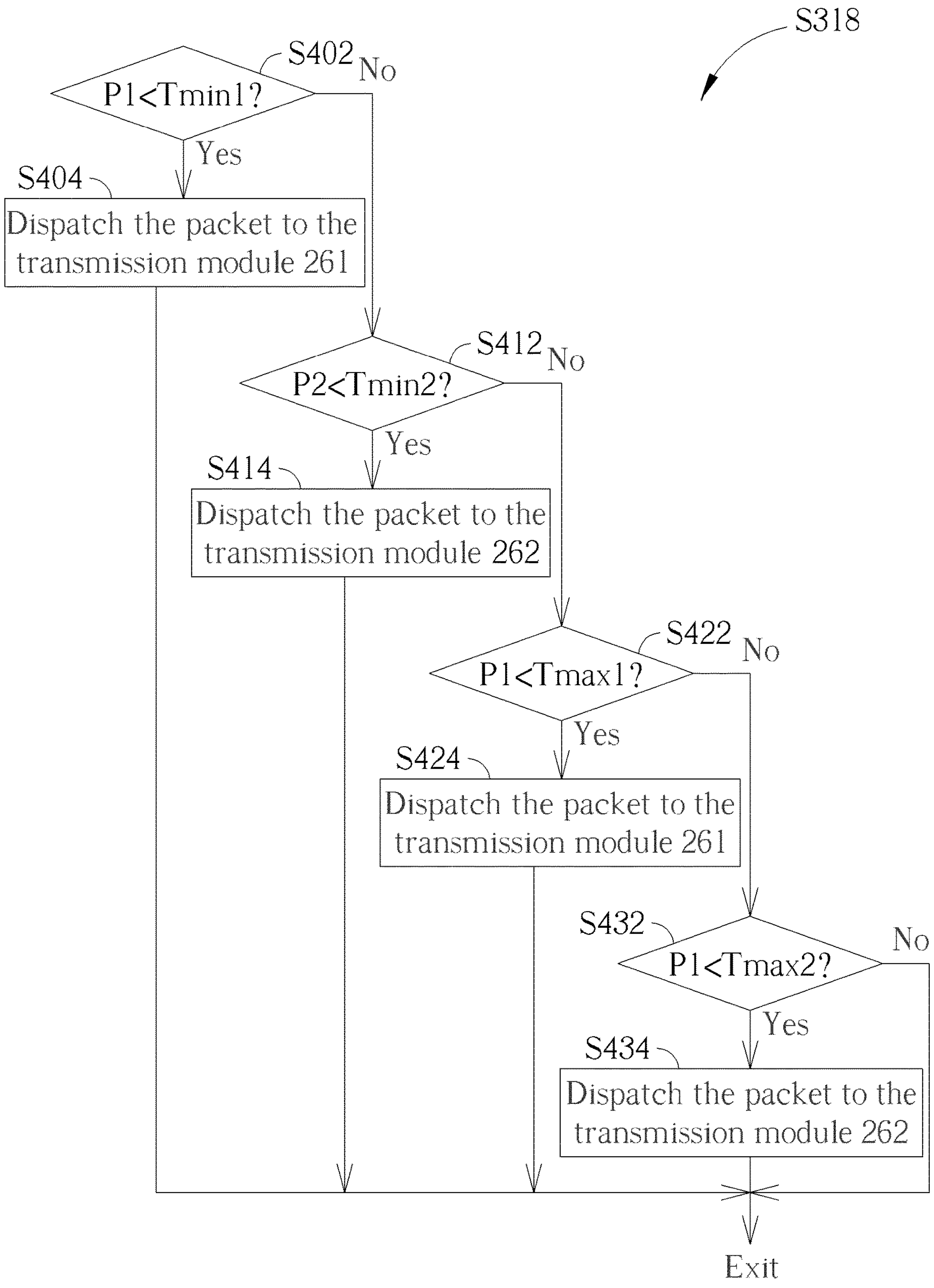
FIG. 4 is a flowchart of Step S318 in the method in FIG. 3.

In some embodiments, the multi-link control module 22 may determine a first transmission capability of the transmission module 261 according to the transmission rate in the first transmission condition and/or the first maximum aggregation number, and determine a second transmission capability of the transmission module 262 according to the transmission rate in the second transmission condition and/or the second maximum aggregation number, and adjust a first priority of the transmission module 261 and a second priority of the transmission module 262 according to the first transmission capability and the second transmission capability. For example, if the second transmission capacity is greater than the first transmission capacity, the multi-link control module 22 may adjust the second priority to be higher than the first priority. The multi-link control module 22 may use the first minimum threshold, the first maximum threshold, the second minimum threshold and the second maximum threshold to dispatch the MAC packets according to the first priority and the second priority as shown in FIG. 4. FIG. 4 will be explained in detail in the subsequent paragraphs.

In the embodiment in FIG. 2, the analysis module 24 may obtain the first transmission condition and the second transmission condition to compute the ratio of packet consumption rates, and thus, the multi-link control module 22 may adjust the thresholds of the transmission module 261 and the transmission module 262 and dispatch the MAC packets to the transmission module 261 or the transmission module 262 in a fast and accurate manner according to the ratio of packet consumption rates, thereby reducing the delay and bandwidth of information feedback significantly, complying with the BA specification, enhancing the transmission reliability, reducing data latency, and reducing the impact of signal interference.

Figure 3A:
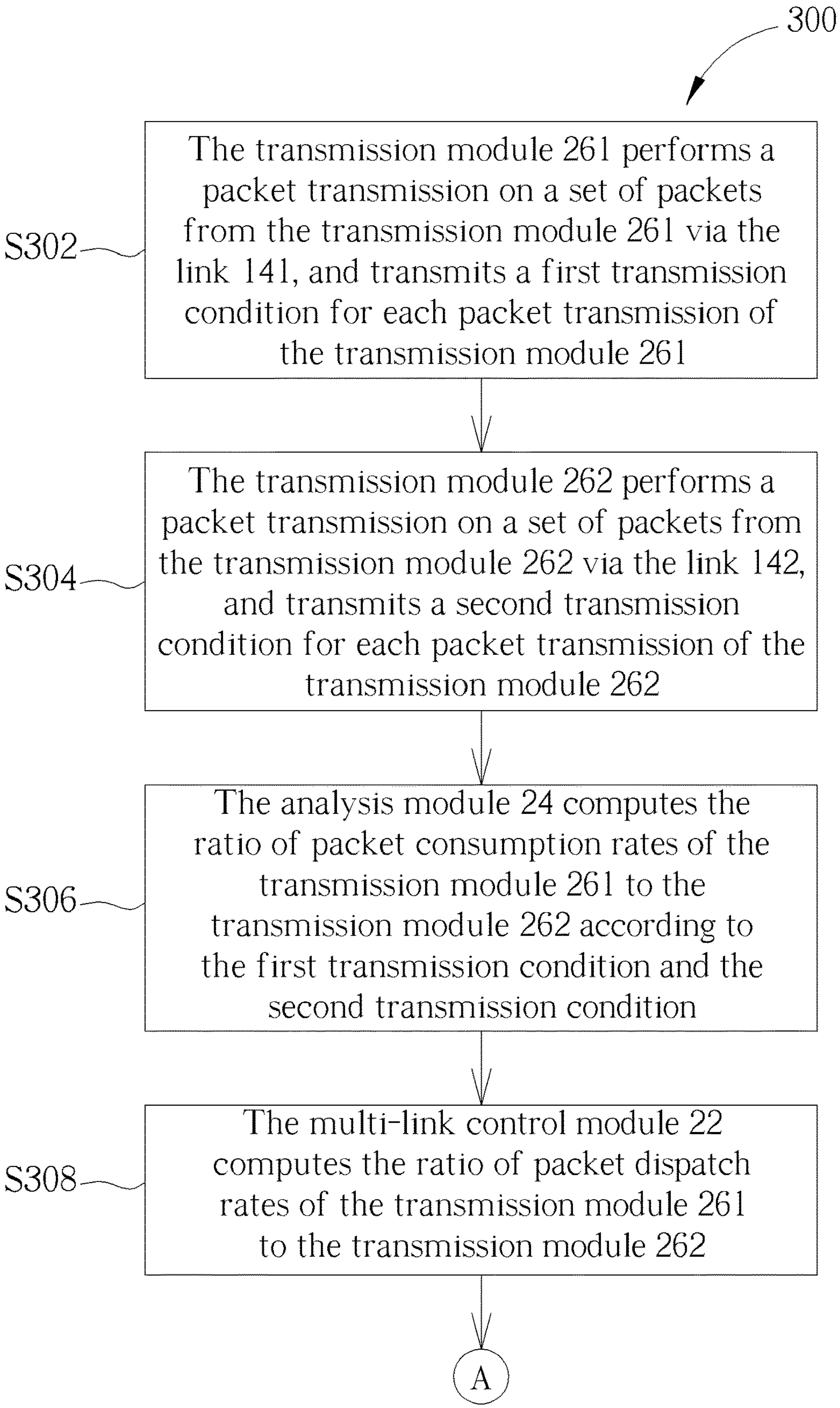
FIGS. 3A and 3B show a flowchart of a method of controlling the AP MLD in FIG. 2.
Figure 3B:
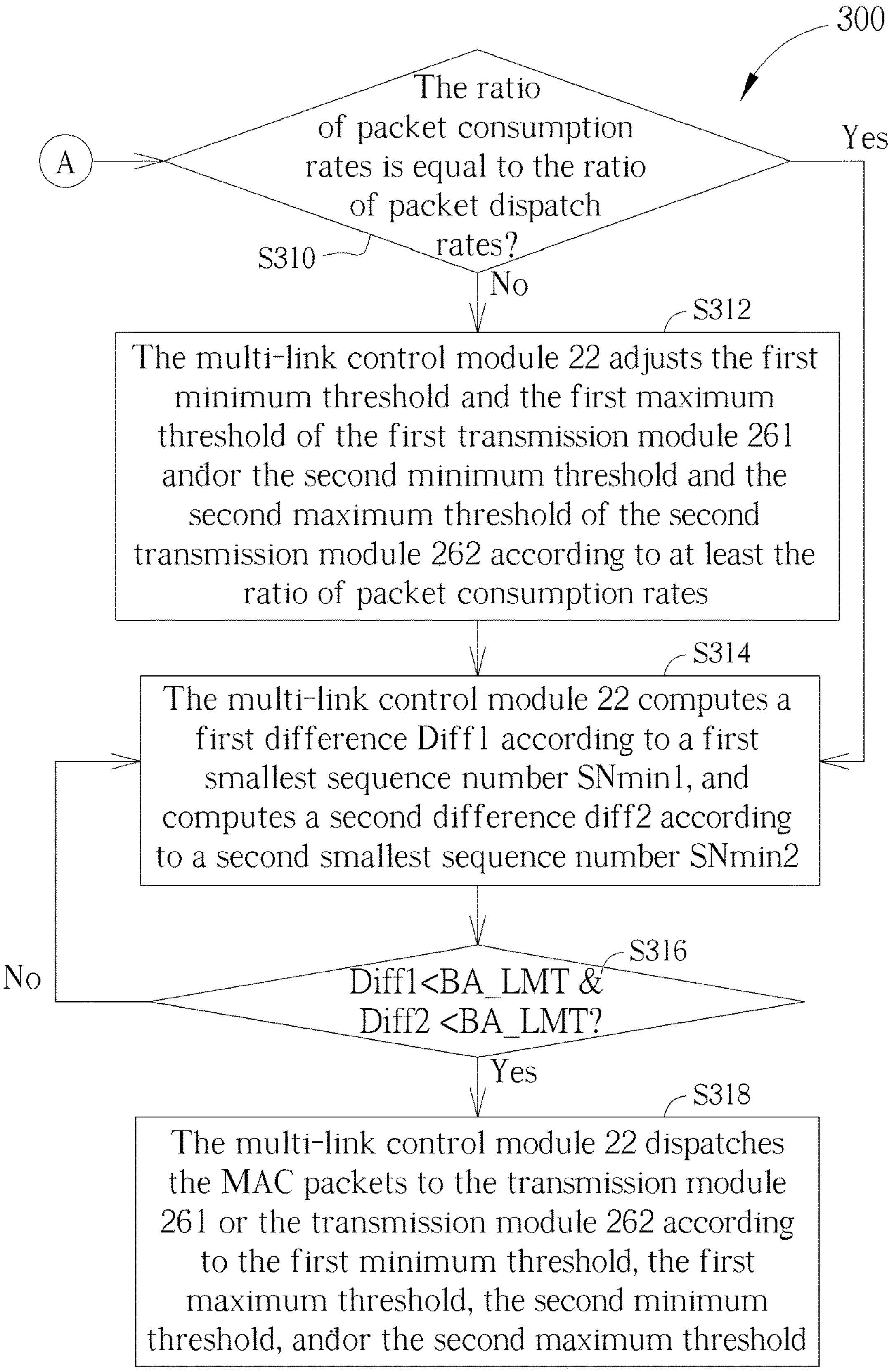

FIGS. 3A and 3B show a flowchart of a method 300 of controlling the AP MLD 10. The method 300 includes Steps S302 to S318, where Steps S302 to S312 are used to adjust the minimum threshold and maximum threshold of the transmission module 261 and the transmission module 262, respectively, Steps S314 and S316 are used to determine whether to dispatch the MAC packets according to the BA window size, and Step S318 is used to dispatch the MAC packets to the transmission module 261 or the transmission module 262 in the multi-link operation. Any reasonable step change or adjustment is within the scope of the disclosure. Steps S302 to S318 are detailed as follows:

Step S302: The transmission module 261 performs a packet transmission on a set of packets from the transmission module 261 via the link 141, and transmits a first transmission condition for each packet transmission of the transmission module 261;

Step S304: The transmission module 262 performs a packet transmission on a set of packets from the transmission module 262 via the link 142, and transmits a second transmission condition for each packet transmission of the transmission module 262;

Step S306: The analysis module 24 computes the ratio of packet consumption rate of the transmission module 261 to the packet consumption rate of the transmission module 262 according to the first transmission condition and the second transmission condition;

Step S308: The multi-link control module 22 computes the ratio of packet dispatch rate of the transmission module 261 to the packet dispatch rate of the transmission module 262 to generate the ratio of packet dispatch rates;

Step S310: The multi-link control module 22 determines whether the ratio of packet consumption rates is equal to the ratio of packet dispatch rates? If so, continue to Step S314; if not, continue to Step S312;

Step S312: The multi-link control module 22 adjusts the first minimum threshold and the first maximum threshold of the first transmission module 261 and/or the second minimum threshold and the second maximum threshold of the second transmission module 262 according to at least the ratio of packet consumption rates;

Step S314: The multi-link control module 22 computes a first difference Diff1 according to the smallest sequence number of the MAC packets to be dispatched and a first smallest sequence number SNmin1, and computes a second difference diff2 according to the smallest sequence number of the MAC packets to be dispatched and a second smallest sequence number SNmin2;

Step S316: The multi-link control module 22 determines whether the first difference Diff1 and the second difference Diff2 are less than the BA window size BA_LMT? If so, continue to Step S318; if not, return to Step S314;

Step S318: The multi-link control module 22 dispatches the MAC packets to the transmission module 261 or the transmission module 262 according to the first minimum threshold, the first maximum threshold, the second minimum threshold, and/or the second maximum threshold.

In Step S302, the number of the set of packets in the transmission module 261 may be equal to the first maximum aggregation number, e.g., 128. In Step S304, the number of the set of packets in the transmission module 262 may be equal to the second maximum aggregation number, e.g., 64.

In Step S306, the analysis module 24 periodically determines the number of successfully transmitted packets and/or the retry rate in the first transmission condition, a first average aggregation number of the transmission module 261, the number of successfully transmitted packets and/or the retry rate in the second transmission condition, a second average aggregation number of the transmission module 262 to computes the ratio of packet consumption rates of the transmission module 261 to the transmission module 262, and transmits the ratio of packet consumption rates to the multi-link control module 22. The predetermined period may be a TBTT. Then, the multi-link control module 22 periodically computes the ratio of packet dispatch rates in the predetermined period (Step S308), compares the ratio of packet consumption rates and the ratio of packet dispatch rates, and determines whether the ratio of consumption rates is equal to the ratio of packet dispatch rates (Step S310). In some embodiments, if an absolute difference between the ratio of packet consumption rates and the ratio of packet dispatch rates exceeds a preset tolerance, the multi-link control module 22 may determine that the ratio of packet consumption rates is different from the ratio of packet dispatch rates. If the absolute difference between the ratio of packet consumption rates and the ratio of packet dispatch rates is within the preset tolerance, the multi-link control module 22 may determine that the ratio of packet consumption rates is equal to the ratio of packet dispatch rates. For example, if the preset tolerance may be 0.5, the ratio of packet consumption rates is 4:3, and the ratio of packet dispatch rates is 2:1, the absolute difference between the ratio of packet consumption rates and the packet dispatch rates exceeds the preset tolerance ($0.67>0.5$), and thus the multi-link control module 22 determines that the ratio of packet consumption rates is different from the ratio of packet dispatch rates. If the ratio of packet consumption rates is 4:3, and the ratio of packet dispatch rates is 1:1, the absolute difference between the ratio of packet consumption rates and the packet dispatch rate is within the preset tolerance ($0.33<0.5$), and thus, the multi-link control module 22 determines that the ratio of packet consumption rates is equal to the ratio of packet dispatch rates.

If the ratio of packet consumption rates is different from the ratio of packet dispatch rates, in Step S312, the multi-link control module 22 adjusts the first minimum threshold and the first maximum threshold and/or the second minimum threshold and second maximum threshold according to at least the ratio of packet consumption rates. In some embodiments, the multi-link control module 22 may only adjust the first minimum threshold and the first maximum threshold according to the ratio of packet consumption rates. For example, if the ratio of packet consumption rates is 2:1, the first minimum threshold is 128, the first maximum threshold is 256, the second minimum threshold is 128, and the second maximum threshold is 256, the multi-link control module 22 may adjust the first minimum threshold to 256 and the first maximum threshold to 512, while maintaining the second minimum threshold at 128 and the second maximum threshold at 256. In some other embodiments, the multi-link control module 22 may only adjust the second minimum threshold and the second maximum threshold according to the ratio of packet consumption rates. For example, if the ratio of packet consumption rates is 2:1, the first minimum threshold is 128, the first maximum threshold is 256, the second minimum threshold is 128, and the second maximum threshold is 256, the multi-link control module 22 may adjust the second minimum threshold to 64 and the second maximum threshold to 128, while maintaining the first minimum threshold at 128 and the first maximum threshold at 256. In some other embodiments, the multi-link control module 22 may adjust the first minimum threshold, the first maximum threshold, the second minimum threshold and the second maximum threshold according to the ratio of packet consumption rates. For example, if the ratio of packet consumption rates is 4:1, the first minimum threshold is 128, the first maximum threshold is 256, the second minimum threshold is 128, and the second maximum threshold is 256, the multi-link control module 22 may adjust the first minimum threshold to 256, the first maximum threshold to 512, the second minimum threshold to 64, and the second maximum threshold to 128. In some embodiments, the multi-link control module 22 may further adjust the first minimum threshold and the first maximum threshold, and/or the second minimum threshold and the second maximum threshold according to the first maximum aggregation number and the second maximum aggregation number, and/or the first link usage information and the second link usage information.

In order to prevent the sequence number overflow, the analysis module 24 obtains the first smallest sequence number SNmin1 of all MAC packets in the transmission module 261, obtains the second smallest sequence number SNmin2 of all MAC packets in the transmission module 262, and the multi-link control module 22 computes a first difference Diff1 according to the smallest sequence number of the MAC packets and the first smallest sequence number SNmin1, computes a second difference Diff2 according to the smallest sequence number of the MAC packets and the second smallest sequence number SNmin2, and compares the BA window size BA_LMT and the first difference Diff1 and compares the BA window size BA_LMT and the second difference Diff2 to determine whether to dispatch the MAC packets to the transmission module 261/262. In some embodiments, if the first smallest sequence number SNmin1/the second smallest sequence number SNmin2 is less than the smallest sequence number of the MAC packets, the multi-link control module 22 may compute a difference between the smallest sequence number of the MAC packets and the smallest sequence number SNmin1/the second smallest sequence number SNmin2 to generate the first difference Diff1/the second difference Diff2. In other embodiments, if the first smallest sequence number SNmin1/second smallest sequence number SNmin2 is greater than or equal to the smallest sequence number of the MAC packets, the multi-link control module 22 may compute the difference between the smallest sequence number of the MAC packets and the smallest sequence number SNmin1/the second smallest sequence number SNmin2, and add the difference to a preset maximum sequence number to generate the first difference Diff1/the second difference Diff2. For example, the sequence numbers of the MAC packets may be set between 1 and 4096, and the preset maximum sequence number may be set to 4096. If the first smallest sequence number SNmin1 is 1, the second smallest sequence number SNmin2 is 4090, and the smallest sequence number of the MAC packets is 1020, since the first smallest sequence number SNmin1 is less than the smallest sequence number of the MAC packets (1<1020), the multi-link control module 22 computes the first difference Diff1 as 1019 (=1020−1), and since the second smallest sequence number SNmin2 is greater than the smallest sequence number of the MAC packets (4090>1020), the multi-link control module 22 computes the second difference Diff2 as 1026 (=(1020−4090)+4096). If both the first difference Diff1 and the second difference Diff2 are less than the BA window size BA_LMT, the multi-link control module 22 may determine that the sequence number overflow has not occurred, and dispatch the MAC packets according to the first minimum threshold, the first maximum threshold, the second minimum threshold, and/or the second maximum threshold to the transmission module 261 or the transmission module 262 (Step S318). If the first difference Diff1 and/or the second difference Diff2 are not less than (i.e., greater than or equal to) the BA window size BA_LMT, the multi-link control module 22 may determine that the sequence number overflow has occurred, and thus stop dispatching the MAC packets, and re-compute the first difference Diff1 and the second difference Diff2 until the first difference Diff1 and the second difference Diff2 are less than the BA window size BA_LMT. For example, if the first difference Diff1 is 1019, the second difference Diff2 is 1026, and the BA window size BA_LMT is 1024, since the second difference Diff2 is greater than the BA window size BA_LMT (1026>1024), even if the first difference Diff1 is less than the BA window size is BA_LMT (1019<1024), the multi-link control module 22 may still determine that the sequence number overflow has occurred, and stop dispatching the MAC packets to the transmission module 261/262.

FIG. 4 is a flowchart of Step S318 in the method 300. Step S408 includes Steps S402 to S434. Any reasonable step change or adjustment is within the scope of the disclosure. Steps S402 to S434 are detailed as follows:

Step S402: The multi-link control module 22 determines whether the first packet number P1 is less than the first minimum threshold Tmin1? If so, proceed to Step S404; if not, proceed to Step S412;

Step S404: The multi-link control module 22 dispatches the packet to the transmission module 261; exit Step S318;

Step S412: The multi-link control module 22 determines whether the second packet number P2 is less than the second minimum threshold Tmin2? If so, proceed to Step S414; if not, proceed to Step S422;

Step S414: The multi-link control module 22 dispatches the packet to the transmission module 262; terminate Step S318;

Step S422: The multi-link control module 22 determines whether the first packet number P1 is less than the first maximum threshold Tmax1? If so, proceed to Step S424; if not, proceed to Step S432;

Step S424: The multi-link control module 22 dispatches the packet to the transmission module 261; exit Step S318;

Step S432: The multi-link control module 22 determines whether the second packet quantity P2 is less than the second maximum threshold Tmax2? If so, proceed to Step S434; if not, exit Step S318;

Step S434: The multi-link control module 22 dispatches the packet to the transmission module 262; exit Step S318.

Figure 5:
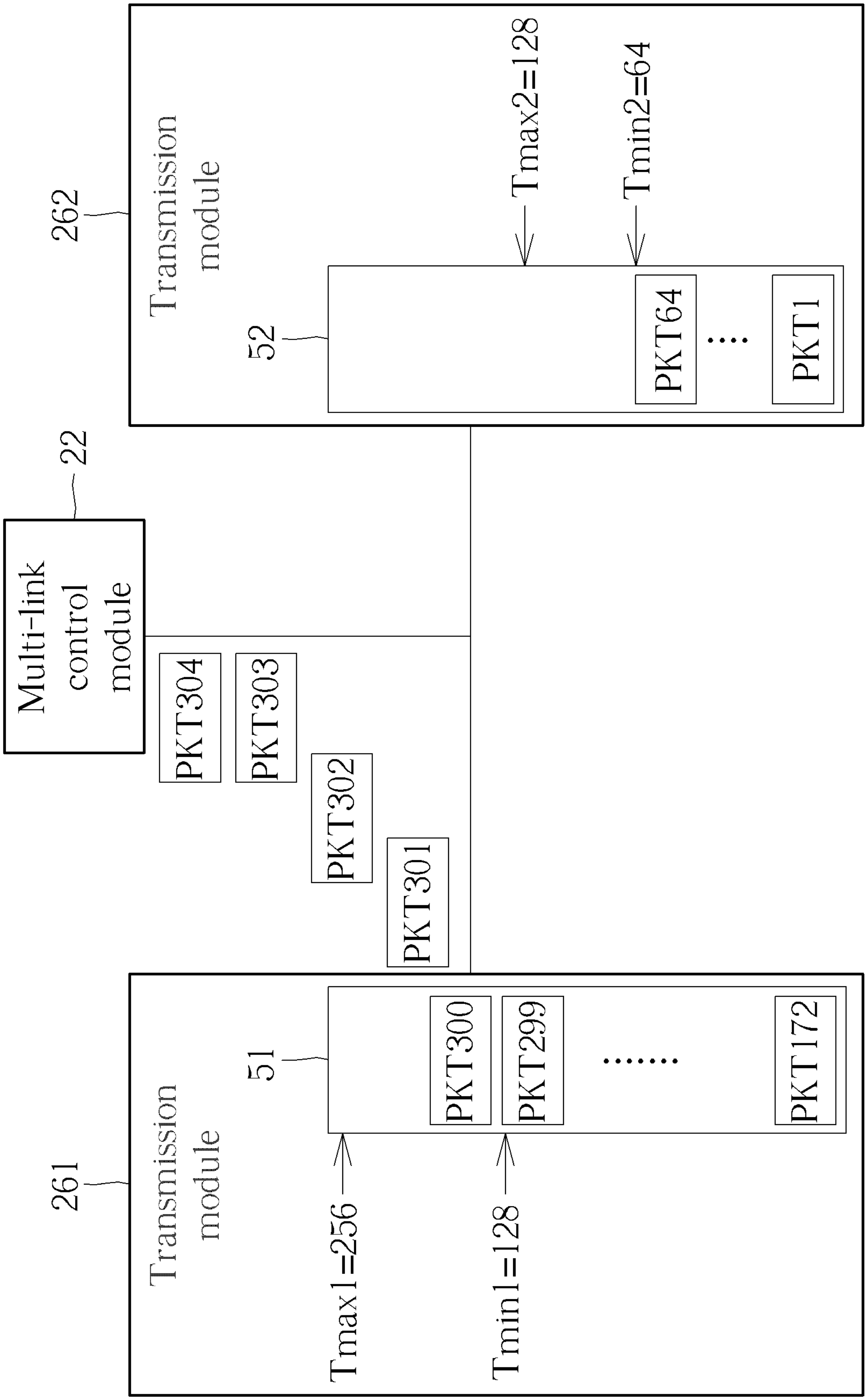
FIG. 5 is a schematic diagram of dispatching the packets in Step S318 of FIG. 4.

Steps S402 to S434 are detailed as follows with reference to FIG. 5. FIG. 5 is a schematic diagram of dispatching the packets in Step S318 of FIG. 4. In FIG. 5, the first priority of the transmission module 261 is higher than the second priority of the transmission module 262, the transmission module 261 includes a queue 51, and the transmission module 262 includes a queue 52. The first minimum threshold Tmin1 of the queue 51 is 128, and the first maximum threshold Tmax1 is 256. The second minimum threshold Tmin2 of the queue 52 is 64, and the second maximum threshold Tmax2 is 128. If there is no sequence number overflow, the multi-link control module 22 will fill the MAC packets to the queue 51 first until reaching the first minimum threshold Tmin1, then fill the MAC packets to the queue 52 until reaching the second minimum threshold Tmin2, then fill the MAC packets to the queue 51 until reaching the first maximum threshold Tmax1, and then fill the MAC packets to the queue 52 until reaching the second maximum threshold Tmax2.

If the first packet quantity P1 of all packets in the queue 51 is less than the first minimum threshold Tmin1 ("Yes" in Step S402), the multi-link control module 22 will dispatch the MAC packets to the transmission module 261 (Step S404), and Step 318 is exited. If the first packet quantity P1 is not less than the first minimum threshold Tmin1 ("No" in Step S402), and a second packet quantity P2 of all packets in the queue 52 is less than the second minimum threshold Tmin2 ("Yes" in Step S412), the multi-link control module 22 will dispatch the MAC packets to the transmission module 262 (Step S414), and Step 318 is exited. If the first packet quantity P1 is not less than the first minimum threshold Tmin1 ("No" in step S402), the second packet quantity P2 is not less than the second minimum threshold Tmin2 ("No" in Step S412), and the first packet quantity P1 is less than the first maximum threshold Tmax1 ("Yes" in Step S422), the multi-link control module 22 will dispatch the MAC packets to the transmission module 261 (Step S424), and Step 318 is exited. If the first packet quantity P1 is not less than the first minimum threshold Tmin1 ("No" in Step S402), the second packet quantity P2 is not less than the second minimum threshold Tmin2 ("No" in Step S412), the first packet quantity P1 is not less than the first maximum threshold Tmax1 ("No" in Step S422), and the second packet quantity P2 is less than the second maximum threshold Tmax2 ("Yes" in Step S432), the multi-link control module 22 will dispatch the MAC packet to the transmission module 262 (Step S434), and Step 318 is exited. If the first packet quantity P1 is not less than the first minimum threshold Tmin1 ("No" in Step S402), the second packet quantity P2 is not less than the second minimum threshold Tmin2 ("No" in Step S412), the first packet quantity P1 is not less than the first maximum threshold Tmax1 ("No" in Step S422), and the second packet quantity P2 is not less than the second maximum threshold Tmax2 ("No" in Step S432), the multi-link control module 22 will buffer the MAC packets and stop to dispatch the MAC packets, and Step 318 is exited.

Since the first priority is higher than the second priority, the first transmission capacity is greater than the second transmission capacity, and the multi-link control module 22 fills the queue 51 first and before filling the queue 52 to enhance the transmission reliability and reduce the data latency. In addition, the multi-link control module 22 fills the queue 51 and the queue 52 alternately according to the first minimum threshold Tmin1, the second minimum threshold Tmin2, the first maximum threshold Tmax1, and the second maximum threshold Tmax2, increasing the utilization of the link 141 and the link 142 while enhancing the throughput.

Referring to FIG. 5, the queue 51 stores the MAC packets PKT172 to PKT300 having the sequence numbers 172 to 300, respectively, and the queue 52 stores MAC packets PKT1 to PKT64 having the sequence numbers 1 to 64, respectively, and the multi-link control module 22 stores the MAC packets PKT301 to PKT304 having the sequence numbers 300 to 304, respectively. If the BA window size is 1024, since the first smallest sequence number SNmin1 in the queue 51 is 172 (PKT172), and the second smallest sequence number SNmin2 in the queue 52 is 1 (PKT1), the multi-link control module 22 may compute the first difference Diff1 as 129 (=301−172), and the second difference Diff2 as 300 (=301−1). The multi-link control module 22 determines that both the first difference Diff1 and the second difference Diff2 are less than the BA window size BA_LMT (129<1024&300<1024), and therefore dispatches the MAC packets PKT301 to PKT304. Since the first packet quantity P1 (=129) is not less than the first minimum threshold Tmin1 (=128) ("No" in Step S402), the second packet quantity P2 (=64) is not less than the second minimum threshold Tmin2 (=64) ("No" in Step S412), and the first packet number P1 (=129) is less than the first maximum threshold Tmax1 (=256) ("Yes" in Step S422), the multi-link control module 22 will dispatch the MAC packets PKT301 to PKT304 to the transmission module 261 (Step S424).

When the connection quality of the link 141 or the link 142 is unfavorable, the multi-link control module 22 may dispatch the MAC packets to one of the transmission module 261 and the transmission module 262 having the better connection. In some embodiments, the multi-link control module 22 may compute an overall throughput of the transmission module 261 and the transmission module 262 in the predetermined period, compute a first throughput of the transmission module 261 in the predetermined period, and compute a second throughput of the transmission module 262 in the predetermined period. In an example, the predetermined period may be the TBTT. If the overall throughput is equal to the first throughput, the second throughput is either very low or is 0, the multi-link control module 22 may dispatch the MAC packets to the transmission module 261, so as to enhance the overall throughput. If the overall throughput is equal to the second throughput, the first throughput is either very low or is 0, the multi-link control module 22 may dispatch the MAC packets to the transmission module 262, so as to enhance the overall throughput.

In other embodiments, the multi-link control module 22 may compute a first data latency for the transmission module 261 transmitting a predetermined amount of data, and compute a second data latency for the transmission module 262 transmitting the predetermined amount of data. For example, the predetermined amount of data may be 1024 MAC packets. In some embodiments, the multi-link control module 22 may dispatch the MAC packets according to an absolute difference between the first data latency and the second data latency. If the second data latency exceeds the first data latency, the multi-link control module 22 may dispatch most of the MAC packets to the transmission module 261, and dispatch the remaining part of the MAC packets to the transmission module 262, so as to reduce the overall data latency. The ratio of dispatching the MAC packets may be determined according to the absolute difference between the first data latency and the second data latency. When the absolute difference between the first data latency and the second data latency is larger, the multi-link control module 22 may increase the ratio of dispatching to the transmission module 261. If the second data latency is less than the first data latency, the multi-link control module 22 may dispatch most of the MAC packets to the transmission module 262, and dispatch the remaining part of the MAC packets to the transmission module 261, so as to reduce the overall data latency. The ratio of dispatching the MAC packets may be determined according to the absolute difference between the first data latency and the second data latency. When the absolute difference between the first data latency and the second data latency is larger, the multi-link control module 22 may increase the ratio of dispatching to the transmission module 262.

Figure 6:
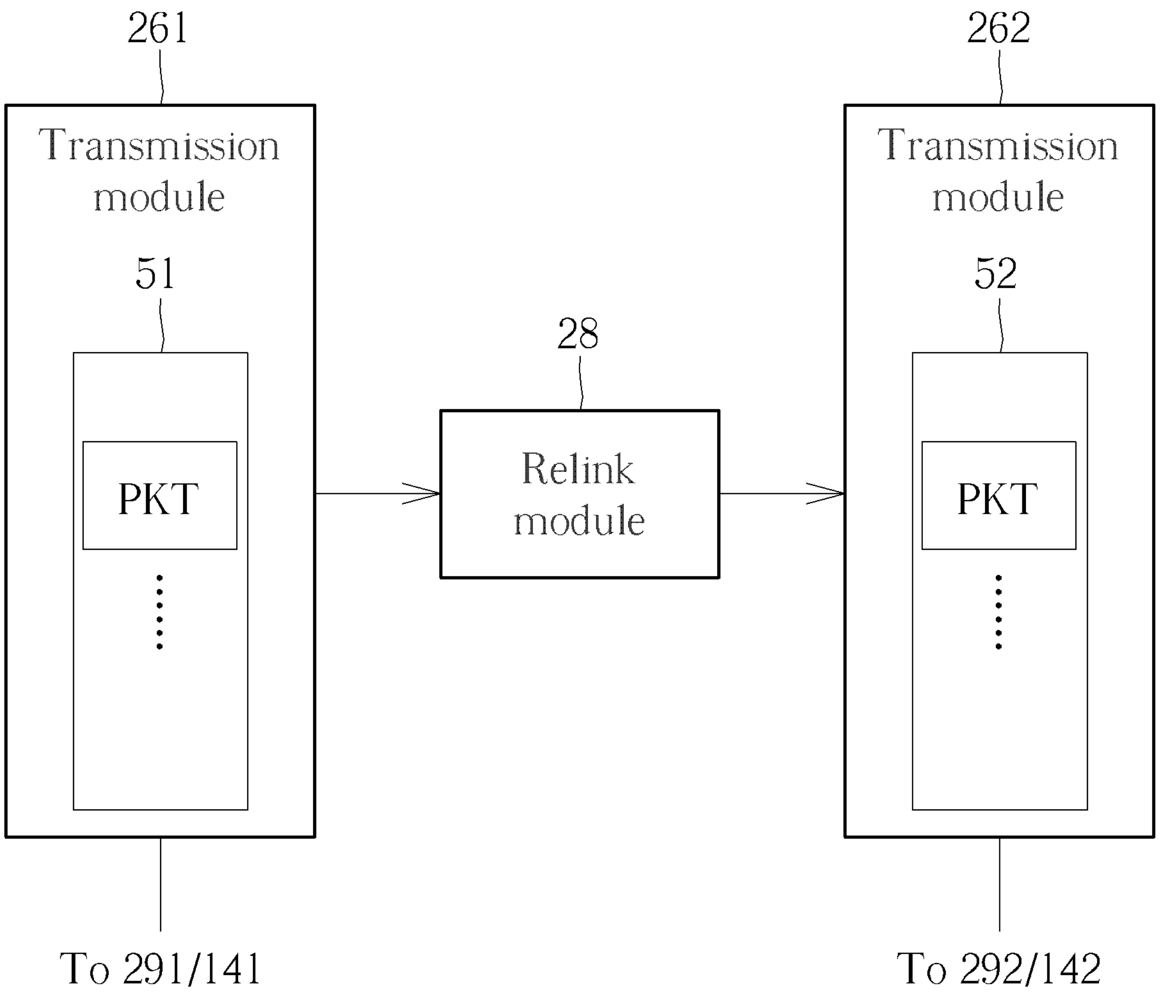
FIG. 6 is a schematic diagram of retransmitting MAC packets by the relink module in FIG. 2.

If a network congestion occurs in the link 141 or the link 142, the relink module 28 may retransmit the MAC packets from one of the transmission module 261 and the transmission module 262 having the network congestion to the other one of the transmission module 261 and the transmission module 262 having no network congestion, thereby enhancing the throughput of the AP MLD 10 while reducing the data latency and increasing the channel utilization. In some embodiments, the analysis module 24 may determine whether a first network congestion occurs on the link 141 according to the first transmission condition, and determine whether a second network congestion occurs on the link 142 according to the second transmission condition. For example, if the number of successfully transmitted MAC packets in a link is less than a preset ratio, such as 10%, the analysis module 24 may determine that network congestion has occurred in the link. If the number of successfully transmitted MAC packets is not less than the preset ratio, the analysis module 24 may determine that no network congestion has occurred in the link. If the first network congestion occurs, the relink module 28 may transmit the MAC packets from the transmission module 261 to the transmission module 262. If the second network congestion occurs, the relink module 28 may transmit the MAC packets from the transmission module 262 to the transmission module 261. FIG. 6 is a schematic diagram of the relink module 28 retransmitting the MAC packets. Since the first network congestion has occurred, the relink module 28 may retransmit all MAC packets from the transmission module 261 to the transmission module 262, for the link 142 to transmit all the MAC packets and the link 141 to transmit no MAC packet, so as to enhance the throughput of the AP MLD 10 while reducing the data latency and increasing the channel utilization.

The embodiments of the present invention discloses a multi-link device and the operation method for dispatching the MAC packets according to the transmission condition and link usage information during a multi-link operation, significantly reducing the delay and bandwidth of information feedback, maintaining the independence of individual links, complying with the BA specification, reflecting the connection quality of the individual links in real time, enhancing the transmission reliability, reducing the data latency, and reducing the impact of signal interference.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-link device comprising:

a first transmission circuitry that performs a packet transmission on a set of packets in the first transmission circuitry via a first link, and transmits a first transmission condition for each packet transmission of the first transmission circuitry;

a second transmission circuitry that performs a packet transmission on a set of packets in the second transmission circuitry via a second link, and transmits a second transmission condition for each packet transmission of the second transmission circuitry;

an analysis circuitry coupled to the first transmission circuitry and the second transmission circuitry, and that computes a ratio of packet consumption rates of the first transmission circuitry and the second transmission circuitry according to the first transmission condition and the second transmission condition; and a multi-link control circuitry coupled to the first transmission circuitry, the second transmission circuitry and the analysis circuitry, and that computes a ratio of packet dispatch rates of the first transmission circuitry and the second transmission circuitry, adjust a first minimum threshold and a first maximum threshold of the first transmission circuitry and/or a second minimum threshold and a second maximum threshold of the second transmission circuitry according to at least the ratio of packet consumption rates if the ratio of packet consumption rates is different from the ratio of packet dispatch rates, and dispatches a packet to the first transmission circuitry or the second transmission circuitry according to the first minimum threshold, the first maximum threshold, the second minimum threshold, and/or the second maximum threshold.

2. The multi-link device of claim 1, wherein:

the first transmission circuitry has a first priority, the second transmission circuitry has a second priority, the first priority is higher than the second priority; and if a first packet quantity of all packets in the first transmission circuitry is less than the first minimum threshold, the multi-link control circuitry dispatches the packet to the first transmission circuitry.

3. The multi-link device of claim 1, wherein:

the first transmission circuitry has a first priority, the second transmission circuitry has a second priority, the first priority is higher than the second priority; and if a first packet quantity of all packets in the first transmission circuitry is not less than the first minimum threshold, and a second packet quantity of all packets in the second transmission circuitry is less than the second minimum threshold, the multi-link control circuitry dispatches the packet to the second transmission circuitry.

4. The multi-link device of claim 1, wherein:

the first transmission circuitry has a first priority, the second transmission circuitry has a second priority, the first priority is higher than the second priority; and if a first packet quantity of all packets in the first transmission circuitry is not less than the first minimum threshold, a second packet quantity of all packets in the second transmission circuitry is not less than the second minimum threshold, and the first packet quantity is less than the first maximum threshold, the multi-link control circuitry dispatches the packet to the first transmission circuitry.

5. The multi-link device of claim 1, wherein:

the first transmission circuitry has a first priority, the second transmission circuitry has a second priority, the first priority is higher than the second priority; and if a first packet quantity of all packets in the first transmission circuitry is not less than the first maximum threshold, and a second packet quantity of all packets in the second transmission circuitry is not less than the second minimum threshold and less than second maximum threshold, the multi-link control circuitry dispatches the packet to the second transmission circuitry.

6. The multi-link device of claim 1, wherein:

the analysis circuitry further obtains first link usage information of the first link and second link usage information of the second link; and the multi-link control circuitry further adjusts the first minimum threshold and the first maximum threshold according to the first link usage information, and adjust the second minimum threshold and the second maximum threshold according to the second link usage information.

7. The multi-link device of claim 1, wherein:

the MAC packet has a control-circuitry smallest sequence number of all packets in the multi-link control circuitry;

the analysis circuitry further obtains a first-link smallest sequence number of all packets in the first transmission circuitry, and obtains a second-link smallest sequence number of all packets in the second transmission circuitry; and the multi-link control circuitry further computes a first difference according to the control-circuitry smallest sequence number and the first-link smallest sequence number, computes a second difference according to the control-circuitry smallest sequence number and the second-link smallest sequence number, and compares the first difference and a block acknowledgment (BA) window size and compare the second difference and the BA window size to determine whether to dispatch the packet.

8. The multi-link device of claim 1, wherein:

the analysis circuitry further detects a first transmission congestion in the first link according to the first transmission condition;

the multi-link device further comprises:

a relink circuitry is coupled to the first transmission circuitry, the second transmission circuitry and the analysis circuitry, and transmits all packets in the first transmission circuitry from the first transmission circuitry to the second transmission circuitry upon detection of the first transmission congestion.

9. The multi-link device of claim 1, wherein:

the multi-link device further computes an overall throughput of the first transmission circuitry and the second transmission circuitry during a predetermined period and a first throughput of the first transmission circuitry during the predetermined period, and dispatches the packet to the first transmission circuitry if the overall throughput is equal to the first throughput.

10. The multi-link device of claim 1, wherein:

the multi-link device further computes a first data latency of the first transmission circuitry and a second data latency of the second transmission circuitry, and dispatches the packet to the first transmission circuitry if the second data latency exceeds the first data latency.

11. A method of controlling a multi-link device, the multi-link device comprising a first transmission circuitry, a second transmission circuitry, an analysis circuitry and a multi-link control circuitry, the analysis circuitry being coupled to the first transmission circuitry and the second transmission circuitry, the multi-link control circuitry being coupled to the first transmission circuitry, the second transmission circuitry and the analysis circuitry, the method comprising:

the first transmission circuitry performing a packet transmission on a set of packets in the first transmission circuitry via a first link, and transmitting a first transmission condition for each packet transmission of the first transmission circuitry;

the second transmission circuitry performing a packet transmission on a set of packets in the second transmission circuitry via a second link, and transmitting a second transmission condition for each packet transmission of the second transmission circuitry;

the analysis circuitry computing a ratio of packet consumption rates of the first transmission circuitry and the second transmission circuitry according to the first transmission condition and the second transmission condition;

the multi-link control circuitry computing a ratio of packet dispatch rates of the first transmission circuitry and the second transmission circuitry;

the multi-link control circuitry adjusting a first minimum threshold and a first maximum threshold of the first transmission circuitry and/or a second minimum threshold and a second maximum threshold of the second transmission circuitry according to at least the ratio of packet consumption rates if the ratio of packet consumption rates is different from the ratio of packet dispatch rates; and the multi-link control circuitry dispatching a packet to the first transmission circuitry or the second transmission circuitry according to the first minimum threshold, the first maximum threshold, the second minimum threshold, and/or the second maximum threshold.

12. The method of claim 11, wherein:

the first transmission circuitry has a first priority, the second transmission circuitry has a second priority, the first priority is higher than the second priority; and the multi-link control circuitry dispatching the packet according to the first minimum threshold, the first maximum threshold, the second minimum threshold, and/or the second maximum threshold comprises:

if a first packet quantity of the packets in the first transmission circuitry is less than the first minimum threshold, the multi-link control circuitry dispatching the packet to the first transmission circuitry.

13. The method of claim 11, wherein:

the first transmission circuitry has a first priority, the second transmission circuitry has a second priority, the first priority is higher than the second priority; and the multi-link control circuitry dispatching the packet according to the first minimum threshold, the first maximum threshold, the second minimum threshold, and/or the second maximum threshold comprises:

if a first packet quantity of all packets in the first transmission circuitry is not less than the first minimum threshold, and a second packet quantity of all packets in the second transmission circuitry is less than the second minimum threshold, the multi-link control circuitry dispatching the packet to the second transmission circuitry.

14. The method of claim 11, wherein:

the first transmission circuitry has a first priority, the second transmission circuitry has a second priority, the first priority is higher than the second priority; and the multi-link control circuitry dispatching the packet according to the first minimum threshold, the first maximum threshold, the second minimum threshold, and/or the second maximum threshold comprises:

if a first packet quantity of all packets in the first transmission circuitry is not less than the first minimum threshold, a second packet quantity of all packets in the second transmission circuitry is not less than the second minimum threshold, and the first packet quantity is less than the first maximum threshold, the multi-link control circuitry dispatching the packet to the first transmission circuitry.

15. The method of claim 11, wherein:

the first transmission circuitry has a first priority, the second transmission circuitry has a second priority, the first priority is higher than the second priority; and the multi-link control circuitry dispatching the packet according to the first minimum threshold, the first maximum threshold, the second minimum threshold, and/or the second maximum threshold comprises:

if a first packet quantity of all packets in the first transmission circuitry is not less than the first maximum threshold, and a second packet quantity of all packets in the second transmission circuitry is not less than the second minimum threshold and less than the second maximum threshold, the multi-link control circuitry dispatching the packet to the second transmission circuitry.

16. The method of claim 11, further comprising:

the analysis circuitry obtaining first link usage information of the first link and second link usage information of the second link; and the multi-link control circuitry adjusting the first minimum threshold and the first maximum threshold according to the first link usage information, and adjusting the second minimum threshold and the second maximum threshold according to the second link usage information.

17. The method of claim 11, wherein the packet has a control-circuitry smallest sequence number of all packets in the multi-link control circuitry, and the method further comprises:

the analysis circuitry obtaining a first-link smallest sequence number of all packets in the first transmission circuitry, and obtaining a second-link smallest sequence number of all packets in the second transmission circuitry;

the multi-link control circuitry computing a first difference according to the control-circuitry smallest sequence number and the first-link smallest sequence number, and computing a second difference according to the control-circuitry smallest sequence number and the second-link smallest sequence number; and the multi-link control circuitry comparing the first difference and a block acknowledgment (BA) window size and comparing the second difference and the BA window size to determine whether to dispatch the packet.

18. The method of claim 11, wherein:

the multi-link device further comprises a relink circuitry coupled to the first transmission circuitry, the second transmission circuitry and the analysis circuitry; and the method further comprises:

the analysis circuitry detecting a first transmission congestion in the first link according to the first transmission condition; and the relink circuitry transmitting all packets in the first transmission circuitry from the first transmission circuitry to the second transmission circuitry upon detection of the first transmission congestion.

19. The method of claim 11, wherein the multi-link control circuitry dispatching the packet to the first transmission circuitry or the second transmission circuitry according to at least the ratio of packet consumption rates comprises:

the multi-link device computing an overall throughput of the first transmission circuitry and the second transmission circuitry during a predetermined period and a first throughput of the first transmission circuitry during the predetermined period; and the multi-link device dispatching the packet to the first transmission circuitry if the overall throughput is equal to the first throughput.

20. The method of claim 11, wherein the multi-link control circuitry dispatching the packet to the first transmission circuitry or the second transmission circuitry according to at least the ratio of packet consumption rates comprises:

the multi-link device computes a first data latency of the first transmission circuitry and a second data latency of the second transmission circuitry; and the multi-link device dispatching the packet to the first transmission circuitry if the second data latency exceeds the first data latency.

* * * * *